Patented Mar. 19, 1935

1,994,709

UNITED STATES PATENT OFFICE 1,994,709

DYESTUFF SALT CONTAINING HEAVY METALS IN COMPLEX COMBINATION IN THE ACID COMPONENT

Karl Holzach and Fritz Lange, Ludwigshafen-on-the-Rhine, Germany, assignors to General Aniline Works, Inc., New York, N. Y., a corporation of Delaware No Drawing. Application November 18, 1932, Serial No. 643,287. In Germany November 25, 1931

11 Claims. (Cl. 260—12)

The present invention relates to improvements in dyestuff salts containing heavy metals in complex combination in the acid component and a process of producing same.

We have found that coloring materials suitable for coloring masses comprising a substance capable of forming films are obtained by causing complex heavy metal compounds of organic dyestuffs containing sulphonic or carboxylic acid groups to react with organic dyestuff bases with the formation of salts. The formation of the salts of the complex heavy metal compounds of organic dyestuffs containing sulphonic or carboxylic acid groups with organic dyestuff bases is effected by causing the two components, namely the complex heavy metal dyestuff compounds and the dyestuff bases to react upon one another in any suitable manner at ordinary or an elevated temperature. Usually temperatures above 100° C. are not used. The preparation of the salts is preferably effected in aqueous media whereby the two components are used in a water-soluble form; the complex heavy metal compounds are preferably employed in the form of their readily water-soluble alkali metal or ammonium salts, but the free acids may also be employed; the dyestuff bases are preferably used in the form of salts, for example their salts with hydrochloric acid. The salts formed which are difficultly soluble in water are separated from the aqueous medium, for example by filtration, and dried. However, the formation of the salts may be effected also in organic solvents whereby the components are used in a form at least partly soluble in the said solvents; for example the complex metal compounds may be used in the form of free acids. The formation of the salts may be effected in the solution of the composition to be colored itself.

Suitable masses comprising a substance capable of forming films are masses consisting of or containing cellulose esters or ethers, or artificial or natural resins, including condensation products of urea and formaldehyde, and solutions of the aforementioned materials in organic solvents, such as lacquers or varnishes and the like. Especially suitable colored masses may be obtained by starting with cellulose esters or ethers. By incorporating the said masses with the salts in question compositions are obtained which are especially deeply colored in a great variety of shades and which are distinguished by an excellent fastness to light. Suitable complex heavy metal compounds of organic dyestuffs containing sulphonic or carboxylic acid groups are for example the compounds of chromable azo dyestuffs, chromable triphenylmethane dyestuffs or hydroxyanthraquinone sulphonic acids with heavy metals, such as chromium, copper, cobalt, nickel and iron; generally speaking the chromium compounds are most favorable. The chromium and copper compounds or ortho-hydroxyazo dyestuffs which contain sulphonic or carboxylic acid groups are especially suitable.

As suitable dyestuff bases may be mentioned the diphenylmethane and triphenylmethane dyestuff bases; especially favorable effects are obtained with triphenylmethane dyestuffs of the rhodamine type, for example with rhodamine B extra, G extra (see Schultz, Farbstofftabellen 7th edition, No. 864 and following).

The said salts are particularly suitable for coloring masses of the kind defined above and solutions thereof, since they are readily soluble in the organic solvents commonly used in the production of such masses, such as aliphatic alcohols or their esters, for example ethyl, butyl and amyl alcohol, glycol and their esters, ketones, such as acetone, methylethyl ketone, dibutyl ketone, cyclohexanone and its homologues, and mixtures of such solvents. For the solvents which may be employed for the preparation of the colored compositions in which the said salts are soluble reference may be had to the solvents described in "Cellulose Ester Varnishes" by Sprexton, London, 1925, and "Natural and Synthetic Resins" by Barry, Drummond and Morrell, London, 1926.

The following examples will further illustrate how this invention may be carried out in practice but the invention is not restricted to these examples. The parts are by weight.

*Example 1*

48 parts of rhodamine B extra (Schultz, Farbstofftabellen, 7th edition, No. 864) are dissolved in water and precipitated with an aqueous solution of 51 parts of the chromium compound of the azo dyestuff from diazotized 4-nitro-2-aminophenol-6-sulphonic acid and aceto-acetic acid anilide at ordinary or slightly elevated temperature. The salt precipitated is filtered off and dried. From 2 to 3 parts thereof are dissolved in 1000 parts of a commercial nitrocellulose lacquer. With the resulting lacquer, bright red coatings which are very fast to light are produced on metals, paper and other substrata.

Similar coatings of somewhat more bluish shades may be obtained by means of the salt prepared in an analogous manner from 48 parts of rhodamine B extra and 58 parts of the chromium compound of the azo dyestuff from diazotized 1-amino-2-naphthol-4-sulphonic acid and 1-phenyl-3-methyl-5-pyrazolone.

*Example 2*

5 parts of the salt obtained by precipitating 48 parts of rhodamine B extra (see Example 1) in aqueous solution with 29 parts of the copper compound of the azo dyestuff derived from diazotized 4-chlor-2-aminophenol-6-sulphonic acid and 2-amino-5-naphthol-7-sulphonic acid (coupled in alkaline solution) are dissolved in 1000 parts of a commercial nitrocellulose lacquer. The resulting lacquer yields bright violet red coatings, very fast to light, on a great variety of substrata.

*Example 3*

1000 parts of celluloid which has been moistened with ethyl alcohol and is capable of being kneaded are thoroughly worked in a suitable kneading apparatus with about 1 part of the salt prepared from 48 parts of rhodamine B extra (see Example 1) and 51 parts of the chromium compound of the azo dyestuff derived from diazotized 4-nitro-2-aminophenol-6-sulphonic acid and 1-phenyl-3-methyl-5-pyrazolone in an analogous manner as described in Example 1. A plastic mass, colored red entirely homogeneously, is thus obtained which may be worked up in the usual manner. The colored mass obtained possesses an excellent fastness to light.

*Example 4*

90 parts of Rhoduline blue 6 G (Schultz, Farbstofftabellen, 7th edition, No. 755) are precipitated in aqueous solution with 51 parts of the chromium compound of the azo dyestuff derived from diazotized 4-nitro-2-aminophenol-6-sulphonic acid and aceto-acetic acid anilide. The salt formed is filtered off and dried. 3 parts thereof are dissolved in 1000 parts of a commercial nitrocellulose lacquer. Blue green coatings of very good fastness to light are obtained with the resulting lacquer.

*Example 5*

2 parts of the salt prepared from 90 parts of Rhoduline blue 6 G and 61 parts of the chromium compound of Chromazurol S (Schultz, Farbstofftabellen, 5th edition, No. 554) in an analogous manner as described in Example 1 are dissolved in 1000 parts of a commercial nitrocellulose lacquer. Pale blue coatings of good fastness to light are obtained with the resulting lacquer.

*Example 6*

36 parts of auramine G (Schultz, Farbstofftabellen, 7th edition (1931), No. 753) dissolved in water are precipitated with an aqueous solution of 51 parts of the chromium compound of the azo dyestuff obtainable by coupling diazotized 4-nitro-2-aminophenol-6-sulphonic acid with aceto-acetic acid anilide. The salt thus obtained is filtered off and dried. 5 parts thereof are dissolved in 1000 parts of a commercial nitrocellulose lacquer. The resulting lacquer yields vivid yellow coatings of good fastness to light, on a great variety of substrata.

What we claim is:—

1. The process of producing coloring materials, which comprises causing a complex heavy metal compound of an organic dyestuff selected from the group consisting of ortho-hydroxyazo-dyestuffs, polyarylmethane dyestuffs and hydroxy anthraquinone sulphonic acids capable of forming complex heavy metal compounds and containing at least one substituent selected from the group consisting of the sulphonic and carboxylic acid groups to react with a base of a polyarylmethane dyestuff free from groups capable of forming complex heavy metal compounds with the formation of a salt.

2. The process of producing coloring materials which comprises causing a complex chromium compound of an organic dyestuff selected from the group consisting of ortho-hydroxyazo-dyestuffs, polyarylmethane dyestuffs and hydroxy anthraquinone sulphonic acids capable of forming complex chromium compounds and containing at least one substituent selected from the group consisting of the sulphonic and carboxylic acid groups to react with a base of a polyarylmethane dyestuff free from groups capable of forming complex heavy metal compounds with the formation of a salt.

3. The process of producing coloring materials, which comprises causing a complex heavy metal compound of an ortho-hydroxyazo-dyestuff containing at least one substituent selected from the group consisting of sulphonic and carboxylic acid groups to react with a base of a polyarylmethane dyestuff free from groups capable of forming complex heavy metal compounds with the formation of a salt.

4. The process of producing coloring materials, which comprises causing a complex chromium compound of an ortho-hydroxyazo-dyestuff containing at least one substituent selected from the group consisting of the sulphonic and carboxylic acid groups to react with a base of a polyarylmethane dyestuff free from groups capable of forming complex heavy metal compounds with the formation of a salt.

5. The process of producing coloring materials which comprises causing a complex chromium compound of an ortho-hydroxyazo-dyestuff containing at least one substituent selected from the group consisting of the sulphonic and carboxylic acid groups to react with the base of a triphenylmethane dyestuff free from groups capable of forming complex heavy metal compounds with the formation of a salt.

6. A salt of a complex heavy metal compound of an organic dyestuff selected from the group consisting of ortho-hydroxyazo dyestuffs, polyarylmethane dyestuffs and hydroxyanthraquinone sulphonic acids capable of forming complex heavy metal compounds and containing at least one substituent selected from the group consisting of the sulphonic and carboxylic acid groups with a base of a polyarylmethane dyestuff free from groups capable of forming complex heavy metal compounds.

7. A salt of a complex chromium compound of an organic dyestuff selected from the group consisting of ortho-hydroxyazo-dyestuffs, polyarylmethane dyestuffs and hydroxyanthraquinone sulphonic acids capable of forming complex chromium compounds and containing at least one substituent selected from the group consisting of the sulphonic and the carboxylic acid groups with a base of a polyarylmethane dyestuff free from groups capable of forming complex heavy metal compounds.

8. A salt of a complex chromium compound of an ortho-hydroxyazo-dyestuff containing at least one substituent selected from the group consisting of the sulphonic and carboxylic acid groups with the base of a triphenylmethane dyestuff free from groups capable of forming complex heavy metal compounds.

9. The salt of rhodamine B extra with the complex chromium compound of the azo dyestuff from diazotized 4-nitro-2-aminophenol-6-sulphonic acid and aceto-acetic acid anilide, coloring nitrocellulose lacquer bright red shades of excellent fastness to light.

10. The salt of rhodamine B extra with the complex chromium compound of the azo dyestuff from diazotized 1-amino-2-naphthol-4-sulphonic acid and 1-phenyl-3-methyl-5-pyrazolone, coloring nitrocellulose lacquer bright bluish red shades of excellent fastness to light.

11. The salt of rhodamine B extra with the complex chromium compound of the azo dyestuff from diazotized 4-nitro-2-aminophenol-6-sulphonic acid and 1-phenyl-3-methyl-5-pyrazolone, coloring celluloid red shades of excellent fastness to light.

KARL HOLZACH.
FRITZ LANGE.